Jan. 15, 1935.   H. H. S. PETERSEN   1,987,970
MACHINE FOR MEASURING STRIP MATERIALS
Filed Feb. 8, 1933    2 Sheets-Sheet 1
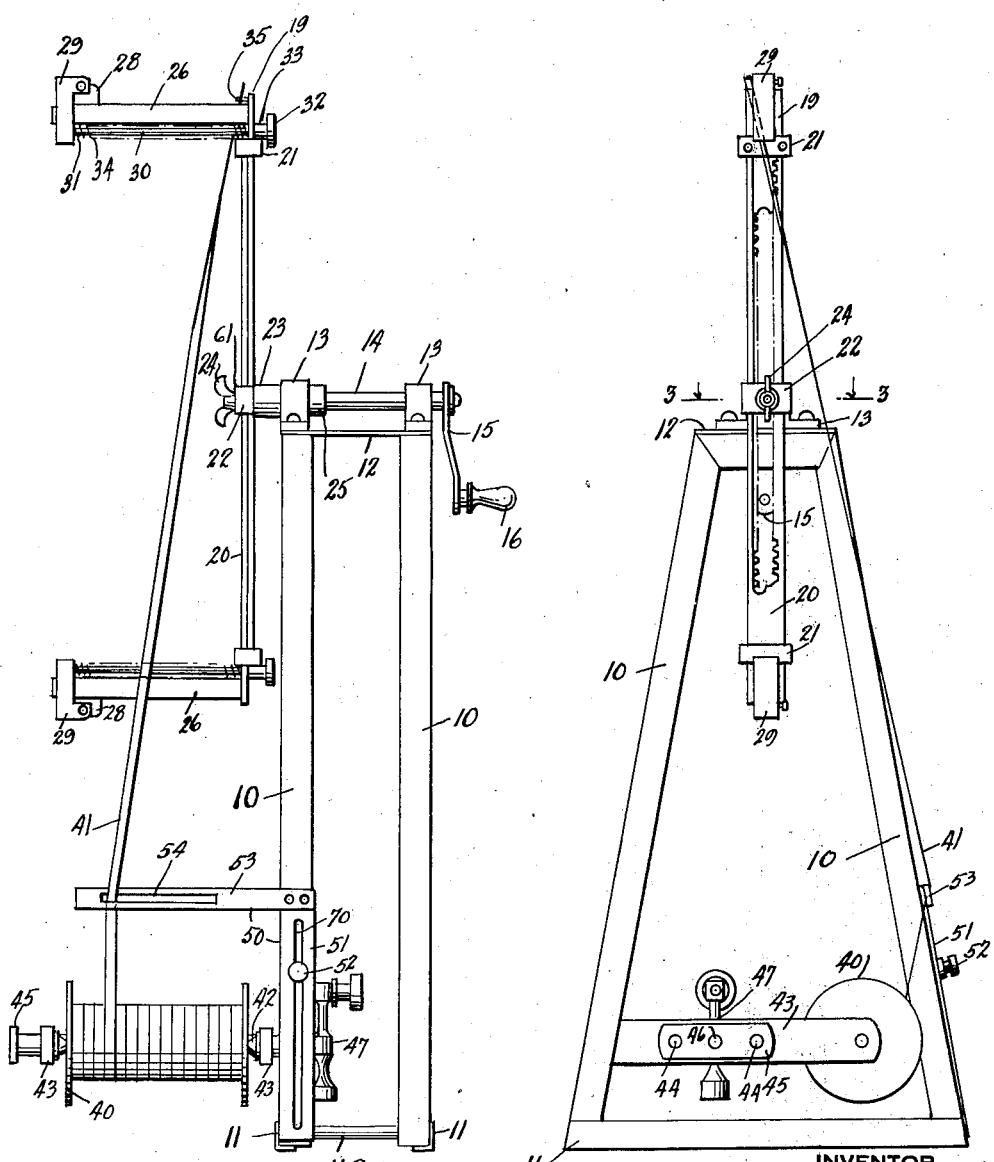

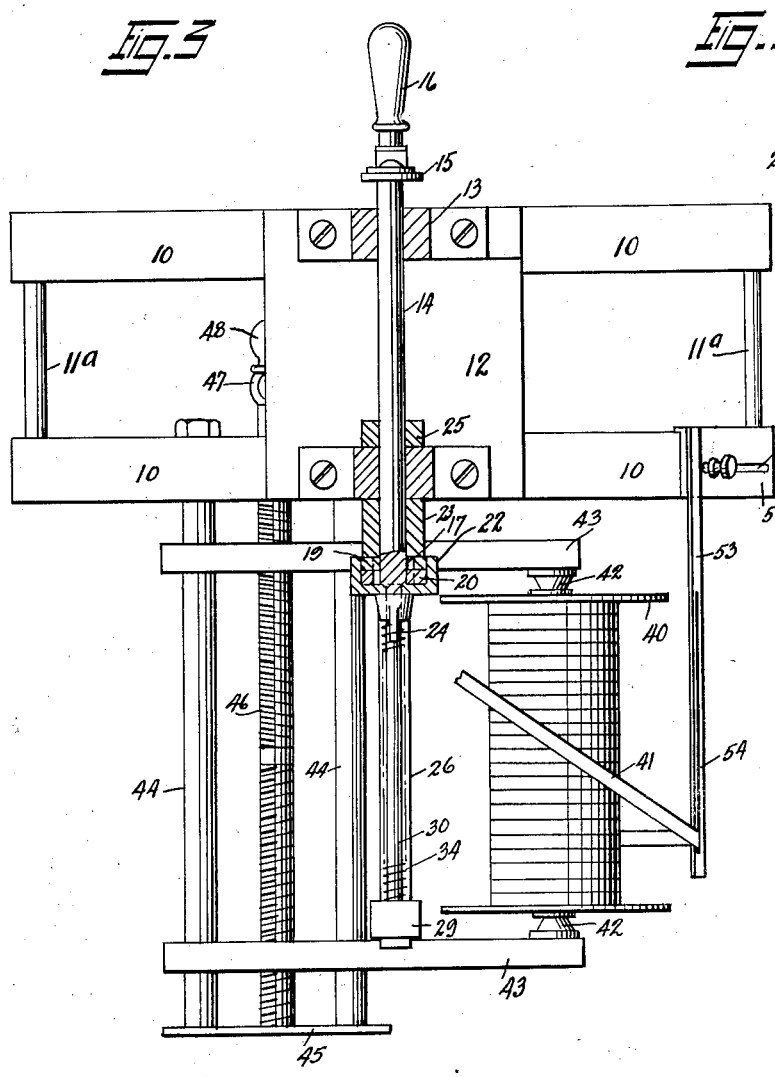
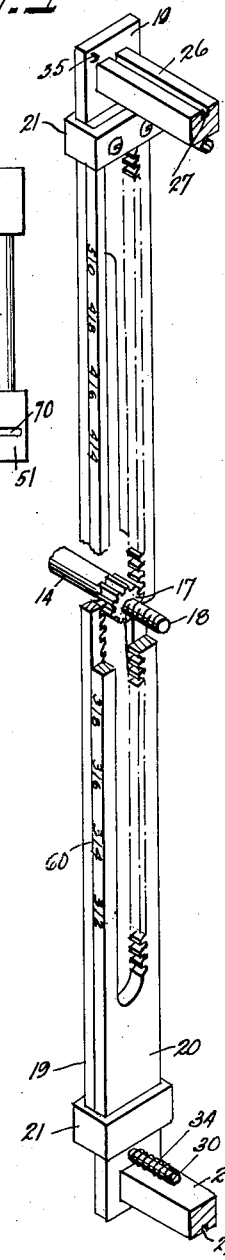

Patented Jan. 15, 1935

1,987,970

UNITED STATES PATENT OFFICE 1,987,970

MACHINE FOR MEASURING STRIP MATERIALS

Hans Holger Sofus Petersen, Scranton, Pa.

Application February 8, 1933, Serial No. 655,757

3 Claims. (Cl. 33—127)

This invention relates to means for measuring and cutting strip materials such as tapes, ribbons and other comparatively narrow materials which are manufactured and marketed in long lengths.

A principal object of the invention is to provide a machine for measuring and cutting strip materials and the like.

Another principal object is to provide adjusting means on the machine for determining the length of strips which are to be measured and cut thereon.

Another principal object is to provide means on the machine for holding spools of various sizes, such spools having material wound thereon which it is desired to measure and cut.

Another principal object is to provide guiding means to position the strip material on the measuring span.

Another principal object is to provide means on the measuring span for adjusting and reading the size of strip materials to be measured and cut.

Other objects will be apparent from reading this specification in connection with the accompanying drawings, in which Figure 1 is a side elevation of a machine embodying my invention;

Figure 2 is a front elevation of the same;

Figure 3 is a cross section taken along the line 3—3 of Figure 2, looking in the direction of the arrows;

Figure 4 is a fragmentary, perspective view of the measuring span illustrating mechanism for adjusting the same; and Figure 5 is a longitudinal view of the shaft for supporting and rotating the measuring span.

Referring now in detail to the drawings, in which similar reference characters refer to similar parts throughout, it will be understood that by span or measuring span the assembly consisting of the arms 26 over which the strip material to be measured and cut is wound, together with the supports for such arms, is intended.

A standard is provided having the legs 10, the base 11 and the tie-rods 11a. At the top of the standard is a plate 12 on which are brackets 13 adapted to support the span shaft 14, at one end of which is carried the crank 15 having a handle 16. Near the other end of said shaft 14 is a pinion 17 integrally secured thereto. The end of said shaft is threaded at 18. Mounted on the pinion 17 are the rack members 19, 20, which are held together in sliding relationship with each other by the bands 21 and the brace 22. Each of these rack members has an elongated slot longitudinally toothed on one side thereof and plain on the other side thereof. These rack members are paired in such way when coupled together as to have the teeth of one member diagonal to the teeth of the other member. To put it another way, in the service position the rack members will be superposed on each other and the teeth of each rack member will be directly opposite to the plain surface of the other rack member. One of the bands 21 is secured to one of the ends of each of the rack members so as to travel with such member during adjustment of the span and the brace 22 is positioned in the middle of said span and adapted to permit the sliding of the rack members therein while the span is being adjusted for length. A spacing collar 23 is provided on the shaft 14 between the rack members 19, 20 on one side and the bracket 13 on the other side. The span assembly, through the rack members, is held in position on the shaft 14 by the winged nut 24. An adjusting collar 25 is secured in the usual way on the shaft 14 to hold the said shaft against longitudinal shift.

At the outer end of each of the rack members 19, 20 is a projected arm 26, grooved at 27 in its outer face. This groove acts as a guide for the edge of the cutting knife 28, said edge being located in said groove. The knife 28 is borne by the slide 29, which slide is adapted to move longitudinally on the arm 26, and for this purpose the said arm passes through the said slide. A draw bar 30 extends through each of the rack members 19, 20 and is integrally connected at 31, to the end of said slide 29. The opposite end of this draw bar is provided with a knob 32 having the stop 33 integral therewith, which stop is adapted to engage the face of the rack member on which it is mounted to limit the outward sliding movement of the slide 29 on the arm 26. This stop also acts as a stop for the rack members 19, 20 in its contracting movement. An expansion spring 34 is mounted on the draw bar 30, and bears at one end on the slide 29 and on the other end on the rack member carrying the draw bar. On the outer end of one of the rack members is a pin or fastening element 35 to which the end of the strip material to be measured and cut is adapted to be fastened preparatory to winding such strip material onto the span.

The strip material to be measured and cut is shown as being supplied from a spool 40, the strip material being designated 41. The spool 40 is mounted on centers 42 integrally carried in the holder arms 43 mounted in sliding contact on the supporting bars 44, which bars are fastened at one end in the tie-plate 45 and at the other end in a cross bar supported by the inner legs 10 of the standard or frame of the machine.

Revolvably mounted in the same supports as the supporting bars 44 is a two-way screw 46, which is threaded through the holder arms 43. The turning of this screw is controlled by the crank 47 having the handle 48, and is adapted to move the holder arms 43 for the spool toward and away from each other so as to regulate the distance or gap between the centers 42 to accommodate any size of spool to be used in the machine.

An angular guide 50 is supported in the frame of the machine. This guide has a leg 51 having a slot 70 through which the set screw 52 passes into the inner leg 10 of the frame, the said screw being provided with a shoulder adapted to bear against the face of the slotted leg 51, and hold the guide in adjusted position on said leg. The other leg 53 of the angular guide 50 is also provided with a slot 54 through which the strip material 41 is adapted to travel on its way to the measuring span.

In operation the measuring span is adjusted to the sizes of strip desired to be cut by loosening the winged nut 24 and then turning the crank 15 in the appropriate direction, at the same time holding the rack members to prevent rotation of the same. The turning of this crank will rotate the pinion 17 which is in mesh with the two rack members 19, 20, the teeth of which rack members are situated in diametrical positions to each other on the pinion, and will move the said members longitudinally in opposite directions to each other, either lengthening or shortening the span, depending upon which way the crank 15 is turned. It will be noted that the rack member 20 has a scale on one of its side faces, which scale, for illustration, is calibrated in inches, the gage marks 60 passing through the numbers indicated. The desired adjustment is ascertained by taking the reading at line 61 of the upper face contact of the bracket 22 with the rack members. For instance, if the length of the strip to be measured and cut is to be 48 inches, the crank 15 is turned in the proper direction until the line between the numerals 4 and 8 on rack member 20 is opposite the line of junction of the upper face of the bracket 22 with the rack members. The winged nut 24 is then tightened and thereby the span is locked in its adjusted position.

The spool 40 is mounted on the centers 42, which are carried by the holder arms 43. For this purpose the gap between the said centers is adjusted to a gap large enough for the spool to be inserted between said centers, and then the spool is inserted and the gap between the centers contracted sufficiently to support the spool in rotating contact on the centers. To accomplish this gap adjustment the crank 47 is turned and with it the two-way screw 46 which carries the holder arms 43 either toward each other or away from each other, depending upon the direction in which the crank 47 is turned. When the gap is large enough to insert the spool between the centers, the centers are moved toward each other by the turning in the proper direction of the crank 47 until the centers rotatably engage the spool.

When the spool has been fitted in place, the strip material 41 is passed through the slot 54 and secured to the fastener 35 at the end of one of the rack members. The crank 15 is then turned, rotating therewith the racks 19, 20 and the projecting arms 26 over which the strip material is wound in measured lengths. The slot 54 confines the lateral movement of the strip material while being wound over the arms 26.

After the desired quantity of strip material has been measured onto the span, the knob 32 with its bar 30 and slide 29 is pulled against the action of the expansion spring 34, drawing the slide 29 across the arm 26, and with it the knife 28 along the groove 27, thereby cutting the strip material wound on the span at the line of said groove. The knob 32 is then released and the slide 29 with its knife 28 is returned to normal position by the action of the spring 34.

The guide 50 is adapted to be adjusted in its vertical position on one of the legs 10 of the frame. For this purpose, the said guide is provided with a slot 70 through which the said screw 52 passes, being in threaded relation with said frame leg. When the guide has been raised or lowered to its proper height, the set screw is tightened and the shoulders 53 thereof bear upon the face of the slotted leg 51 and hold the guide securely in place.

I have illustrated and described what I believe to be the best embodiment of my invention. I do not wish to be limited in patent protection, however, to the embodiment shown, but what I desire to secure by Letters Patent is set forth in the appended claims.

I claim:

1. In a machine for measuring strip material, a rotatable span having a pair of slotted rack members having teeth on one side of the slot and a plain surface on the other side of the slot, said rack members being superposed upon each other so that the toothed side of one rack member will be adjacent to the plain side of the other rack member, and being banded together and adapted to slide longitudinally on each other, a pinion in mesh with the teeth of both rack members, and means for tightening said rack members and pinion together to adapt them for unitary operation.

2. In a machine for measuring strip material, a rotatable span having a pair of slotted rack members having teeth on one side of the slot and a plain surface on the other side of the slot, said rack members being superposed upon each other so that the toothed side of one rack member will be adjacent to the plain side of the other rack member, and being banded together and adapted to slide longitudinally on each other, a pinion in mesh with the teeth of both rack members, means for tightening said rack members and pinion together to adapt them for unitary operation, and an arm angularly projecting in the same direction from each of said rack members.

3. In a machine for measuring strip material, a rotatable span having a pair of slotted rack members having teeth on one side of the slot and a plain surface on the other side of the slot, said rack members being superposed upon each other so that the toothed side of one rack member will be adjacent to the plain side of the other rack member, and being banded together and adapted to slide longitudinally on each other, a scale on one of said rack members, and means for reading by said scale the longitudinal measurement of the span, a pinion in mesh with the teeth of both rack members, means for tightening said rack members and pinion together to adapt them for unitary operation, and an arm angularly projecting in the same direction from each of said rack members.

HANS HOLGER SOFUS PETERSEN.